United States Patent
Kim et al.

(10) Patent No.: US 11,706,294 B2
(45) Date of Patent: *Jul. 18, 2023

(54) CONNECTION METHOD FOR SMART HOME DEVICE AND APPARATUS THEREOF

(71) Applicant: Samsung Electronics Co., Ltd., Gyeonggi-do (KR)

(72) Inventors: Junhyung Kim, Gyeonggi-do (KR); Dongkeon Kong, Gyeonggi-do (KR); Sehoon Kim, Seoul (KR); Jaiick Chun, Gyeonggi-do (KR); Yumi Sohn, Gyeonggi-do (KR); Kangjin Yoon, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/525,002

(22) Filed: Nov. 12, 2021

(65) Prior Publication Data

US 2022/0078232 A1    Mar. 10, 2022

Related U.S. Application Data

(63) Continuation of application No. 16/702,074, filed on Dec. 3, 2019, now Pat. No. 11,252,229, which is a
(Continued)

(30) Foreign Application Priority Data

Dec. 20, 2013 (KR) .......................... 10-2013-0160140
Aug. 6, 2014  (KR) .......................... 10-2014-0101192

(51) Int. Cl.
*H04L 67/104*   (2022.01)
*H04W 76/14*    (2018.01)
(Continued)

(52) U.S. Cl.
CPC ........ *H04L 67/1046* (2013.01); *H04L 12/281* (2013.01); *H04L 67/1068* (2013.01);
(Continued)

(58) Field of Classification Search
CPC ............... H04L 67/1046; H04L 12/281; H04L 67/1068; H04L 67/12; H04L 2012/2841;
(Continued)

(56) References Cited

U.S. PATENT DOCUMENTS 10,506,035 B2 * 12/2019 Kim .................... H04L 67/1046
2003/0229595 A1   12/2003 Mononen
(Continued)

FOREIGN PATENT DOCUMENTS

| CN | 1905764 | 1/2007 |
| CN | 101267378 | 9/2008 |

(Continued)

OTHER PUBLICATIONS

PCT/ISA/210 Search Report issued on PCT/KR2014/012612, dated Jun. 21, 2016 (pp. 3).
(Continued)

*Primary Examiner* — Michael K Phillips
(74) *Attorney, Agent, or Firm* — The Farrell Law Firm, P.C.

(57) ABSTRACT

A method and apparatus are provided for connecting a user equipment to electronic devices. The method includes receiving, for a connection to an electronic device, a first broadcast message transmitted by the electronic device according to a first communication mode, wherein the first broadcast message includes information indicating whether the electronic device supports a connection to the electronic device according to at least one of the first communication mode or a second communication mode that is different from the first communication mode; determining whether the
(Continued)

electronic device supports the connection to the electronic device according to at least one of the first communication mode or the second communication mode based on the information; and establishing the connection to the electronic device according to the first communication mode or the second communication mode based on a result of the determining.

12 Claims, 11 Drawing Sheets

Related U.S. Application Data continuation of application No. 15/105,794, filed as application No. PCT/KR2014/012612 on Dec. 19, 2014, now Pat. No. 10,506,035.

(51) Int. Cl.
| | |
|---|---|
| *H04W 4/80* | (2018.01) |
| *H04W 12/50* | (2021.01) |
| *H04L 12/28* | (2006.01) |
| *H04L 67/1061* | (2022.01) |
| *H04L 67/12* | (2022.01) |
| *H04W 12/08* | (2021.01) |
| *H04W 48/20* | (2009.01) |
| *H04W 12/73* | (2021.01) |
| *H04W 84/12* | (2009.01) |

(52) U.S. Cl.
CPC ............ *H04L 67/12* (2013.01); *H04W 4/80* (2018.02); *H04W 12/08* (2013.01); *H04W 12/50* (2021.01); *H04W 48/20* (2013.01); *H04W 76/14* (2018.02); *H04L 2012/2841* (2013.01); *H04W 12/73* (2021.01); *H04W 84/12* (2013.01)

(58) Field of Classification Search
CPC .... H04L 12/2816; H04W 4/80; H04W 12/08; H04W 12/50; H04W 48/20; H04W 76/14; H04W 12/73; H04W 84/12; H04W 8/22; H04W 8/005; H04W 88/06; H04W 76/40; H04W 4/70; H04W 48/16; H04W 48/10; H04W 60/00; H04W 76/10; H04W 88/02
See application file for complete search history.

(56) References Cited

U.S. PATENT DOCUMENTS

| | | | |
|---|---|---|---|
| 2007/0019822 A1 | 1/2007 | Seo et al. | |
| 2007/0026794 A1* | 2/2007 | Ayyagari | H04L 41/00 455/11.1 |
| 2008/0101278 A1* | 5/2008 | Bengtsson | H04L 51/04 370/328 |
| 2011/0149806 A1 | 6/2011 | Verma | |
| 2011/0225305 A1* | 9/2011 | Vedantham | H04W 4/08 709/227 |
| 2012/0054493 A1 | 3/2012 | Bradley | |
| 2012/0130513 A1 | 5/2012 | Hao et al. | |
| 2013/0035077 A1 | 2/2013 | Tsai | |
| 2013/0176897 A1 | 7/2013 | Wang | |
| 2013/0252656 A1 | 9/2013 | Lee et al. | |
| 2013/0297422 A1* | 11/2013 | Hunter | H04H 60/63 705/14.58 |
| 2013/0335203 A1 | 12/2013 | Sun et al. | |
| 2014/0004793 A1* | 1/2014 | Bandyopadhyay | H04W 4/80 455/41.1 |
| 2014/0068023 A1* | 3/2014 | Arickan | H04L 61/5014 709/220 |
| 2014/0085059 A1 | 3/2014 | Chen et al. | |
| 2014/0254466 A1* | 9/2014 | Wurster | H04L 51/18 370/312 |
| 2014/0254577 A1 | 9/2014 | Wright et al. | |
| 2014/0269473 A1* | 9/2014 | Kondabattini | H04W 52/0209 370/311 |
| 2014/0323048 A1* | 10/2014 | Kang | H04W 4/80 455/41.2 |
| 2014/0369330 A1* | 12/2014 | Sinha | H04W 8/005 370/338 |
| 2015/0006719 A1 | 1/2015 | Gupta et al. | |
| 2015/0023183 A1* | 1/2015 | Ilsar | H04W 48/08 370/254 |
| 2015/0071052 A1 | 3/2015 | Hershberg et al. | |
| 2015/0085725 A1 | 3/2015 | Estevez | |
| 2015/0097689 A1 | 4/2015 | Logue | |
| 2015/0172757 A1* | 6/2015 | Kafle | H04N 21/43637 725/81 |
| 2015/0271823 A1 | 9/2015 | Gao | |
| 2016/0037436 A1 | 2/2016 | Spencer et al. | |
| 2016/0066234 A1 | 3/2016 | Cho | |
| 2016/0135241 A1 | 5/2016 | Gujral et al. | |
| 2016/0302026 A1 | 10/2016 | Lee | |
| 2017/0134911 A1 | 5/2017 | Kakani | |
| 2019/0028338 A1 | 1/2019 | Kozura | |

FOREIGN PATENT DOCUMENTS

| | | |
|---|---|---|
| CN | 202615224 | 12/2012 |
| CN | 102882751 | 1/2013 |
| CN | 103107926 | 5/2013 |
| CN | 103107927 | 5/2013 |
| CN | 103345232 | 10/2013 |
| JP | 2016-504821 | 2/2016 |
| KR | 1020120014076 | 2/2012 |
| KR | 1020130107617 | 10/2013 |
| TW | 201308087 | 2/2013 |
| WO | WO 01/71981 | 9/2001 |

OTHER PUBLICATIONS

PCT/ISA/237 Written Opinion issued on PCT/KR2014/012612, dated Feb. 27, 2015 (pp. 5).
Chinese Office Action dated Apr. 1, 2019 issued in counterpart application No. 201480069819.1, 6 pages.
Hershberg et al. US 20150071052 and in further view of Zigbee, "ZigBee Specification," Sep. 19, 2012, ZigBee, 053474r20 (Year: 2012).
Di Yang, Design and Implementation of Smart Home Control System Based on Internet of Things, Electronic word, Nov. 2012, 8 pages.
Chinese Office Action dated Apr. 22, 2021 issued in counterpart application No. 201911225470.7, 12 pages.

* cited by examiner (PRIOR ART)

CONNECTION METHOD FOR SMART HOME DEVICE AND APPARATUS THEREOF

CROSS-REFERENCE TO RELATED APPLICATION(S)

This application is a Continuation of U.S. patent application Ser. No. 16/702,074, which was filed in the U.S. Patent and Trademark Office (USPTO) on Dec. 3, 2019, which is a Continuation of U.S. patent application Ser. No. 15/105,794, which was filed in the USPTO on Jun. 17, 2016, issued as U.S. Pat. No. 10,506,035 on Dec. 10, 2019, which is a National Phase Entry of PCT International Application No. PCT/KR2014/012612, which was filed on Dec. 19, 2014, and claims priority to Korean Patent Application No. 10-2013-0160140, which was filed on Dec. 20, 2013, and Korean Patent Application No. 10-2014-0101192, which was filed on Aug. 6, 2014, the entire content of each of which is incorporated herein by reference.

BACKGROUND

1. Field

The present invention relates generally to a method and apparatus for connecting smart home devices.

2. Description of Related Art

A smart home refers to a home environment where home devices including home appliances are connected together through a home network so that they can be remotely controlled anytime anywhere. To realize smart homes, various smart home devices have been developed in recent years and standardization efforts are under way in various areas including home platforms, wired/wireless home networks, intelligent information appliances, and green homes.

Referring to FIG. 1, a home appliance 101 operating in a smart home communicates with a user equipment 103 to exchange information needed for control (as indicated by indicia 107) and the user equipment 103 registers the home appliance 101 at an access point (AP) 105 of a smart home service provider on the basis of the exchanged information (as indicated by indicia 109). After registration, the home appliance 101 can be controlled through the AP 105. Here, the home appliance 101 may communicate with the user equipment 103 in Soft AP mode or Wi-Fi peer to peer (P2P) mode. The communication mode of the home appliance 101 may be determined according to capabilities thereof. To communicate with the home appliance 101, the user equipment 103 makes a connection attempt according to the communication mode used by the home appliance 101. This procedure for home appliance registration may be referred to as easy setup. Such easy setup may be used to attach and register a home appliance to the home network in a rapid manner with minimal user intervention.

During easy setup, to connect to a home appliance to be registered, the user equipment may have to receive information on the communication mode of the home appliance from the user. However, as it is not easy for the user to know the communication mode used by the home appliance, the user may be inconvenienced by registration of the home appliance.

For example, Soft AP mode and Wi-Fi P2P mode are different in terms of procedures, messages, and information elements used for registration. Hence, when the communication mode of a home appliance is not known or wrong communication mode is selected at the time of registration, it may be difficult to connect the home appliance to the user equipment.

As such, it is necessary to develop a method that enables the user equipment to detect the communication mode of a home appliance, to connect to the home appliance for communication, and to register the home appliance at the AP without excessive user intervention.

SUMMARY

The present invention has been made in view of the above problems.

Accordingly, an aspect of the present invention is to provide a method and apparatus that, in a process of using a user equipment to register various smart home devices at an access point (AP) providing smart home services, enable efficient connection establishment between the user equipment and a smart home device.

Another aspect of the present invention is to provide a method and apparatus that enable a user equipment making a registration attempt for a smart home device to detect the communication mode of the smart home device and to connect to the smart home device for communication.

In accordance with an aspect of the present invention, there is provided a method for connecting a user equipment to electronic devices. The method includes receiving, for a connection to an electronic device, a first broadcast message transmitted by the electronic device according to a first communication mode, wherein the first broadcast message includes information indicating whether the electronic device supports a connection to the electronic device according to at least one of the first communication mode or a second communication mode that is different from the first communication mode; determining whether the electronic device supports the connection to the electronic device according to at least one of the first communication mode or the second communication mode based on the information, and establishing the connection to the electronic device according to the first communication mode or the second communication mode based on a result of the determining.

In accordance with another aspect of the present invention, there is provided a user equipment capable of connecting to electronic devices. The user equipment includes a transceiver configured to communicate with one or more of the electronic devices; and a controller configured to receive, for a connection to an electronic device, a first broadcast message transmitted by the electronic device according to a first communication mode, wherein the first broadcast message includes information indicating whether the electronic device supports a connection to the electronic device according to at least one of the first communication mode or a second communication mode that is different from the first communication mode; determine whether the electronic device supports the connection to the electronic device according to at least one of the first communication mode or the second communication mode based on the information; and establish the connection to the electronic device according to the first communication mode or the second communication mode based on a result of the determining.

In a feature of the present invention, the provided method and apparatus enable a user equipment making a registration attempt for a smart home device to detect the communication mode of the smart home device and to connect to the smart home device for communication with minimal user intervention.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

The phraseology and terminology used in the description is for the purpose of description and should not be regarded as limiting. It will be understood that technical and scientific terms used herein should be interpreted as having a meaning that is consistent with their meaning in the context of the specification and relevant art and should not be interpreted in an idealized or overly formal sense unless expressly so defined herein.

In the description, the singular forms "a," "an" and "the" are intended to include the plural forms as well, unless the context clearly indicates otherwise. It will be understood that the terms "comprising," "including," "having" and variants thereof specify the presence of stated features, steps, and/or components, but do not preclude the presence or addition of one or more other features, steps, and/or components.

In the description, "frame" may be used interchangeably with "message frame" or "message." For example, "broadcast frame" may have the same meaning as "broadcast message frame" or "broadcast message." In addition, "broadcast message" may be used interchangeably with "advertisement message." Further, "beacon" may be used interchangeably with "beacon frame" or "beacon message."

Hereinafter, exemplary embodiments of the present invention are described in detail with reference to the accompanying drawings. Detailed descriptions of well-known functions and structures incorporated herein may be omitted to avoid obscuring the subject matter of the present invention. Particular terms may be defined to describe the invention in the best manner. Accordingly, the meaning of specific terms or words used herein should be construed in accordance with the spirit of the invention.

In the following description, a home appliance is described as a representative smart home device. However, various other smart home devices may also be employed in embodiments of the present invention. A user equipment (UE) is described as a representative device communicating with smart home devices. However, various other electronic devices may also be employed in embodiments of the present invention.

In the following embodiments, Wi-Fi P2P mode and Soft AP mode are described as a representative example of communication mode. However, other examples of communication mode such as Bluetooth and ZigBee may also be employed in embodiments of the present invention. In such a case, procedures for discovery or connection and message frames corresponding to the selected communication mode may be used in the description of the present invention without significant modifications.

Figure 1:
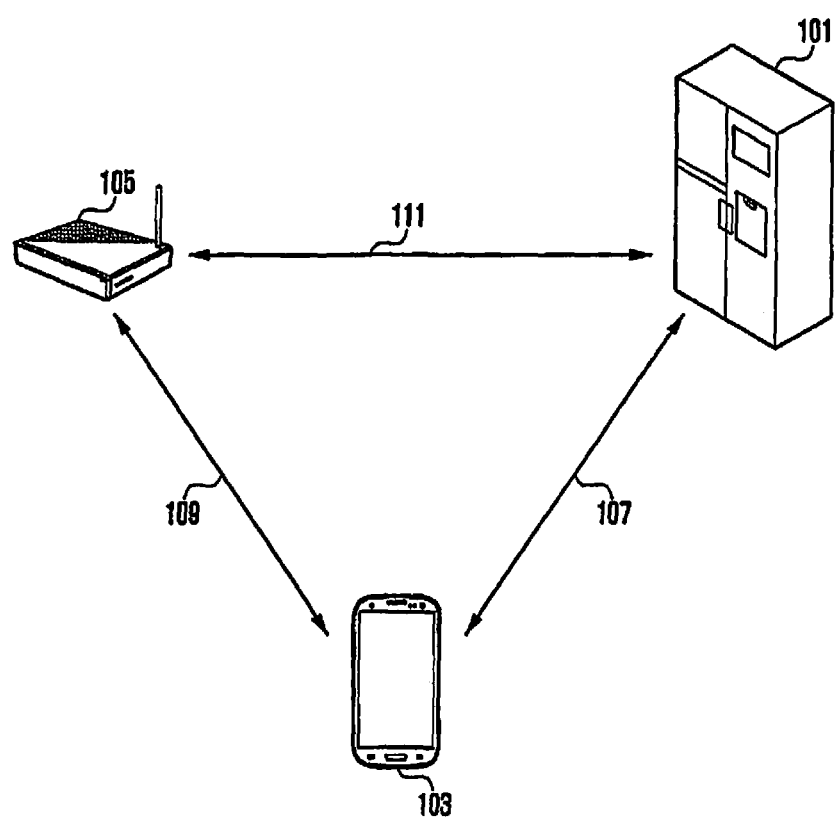
FIG. 1 illustrates a smart home environment.
Figure 2:
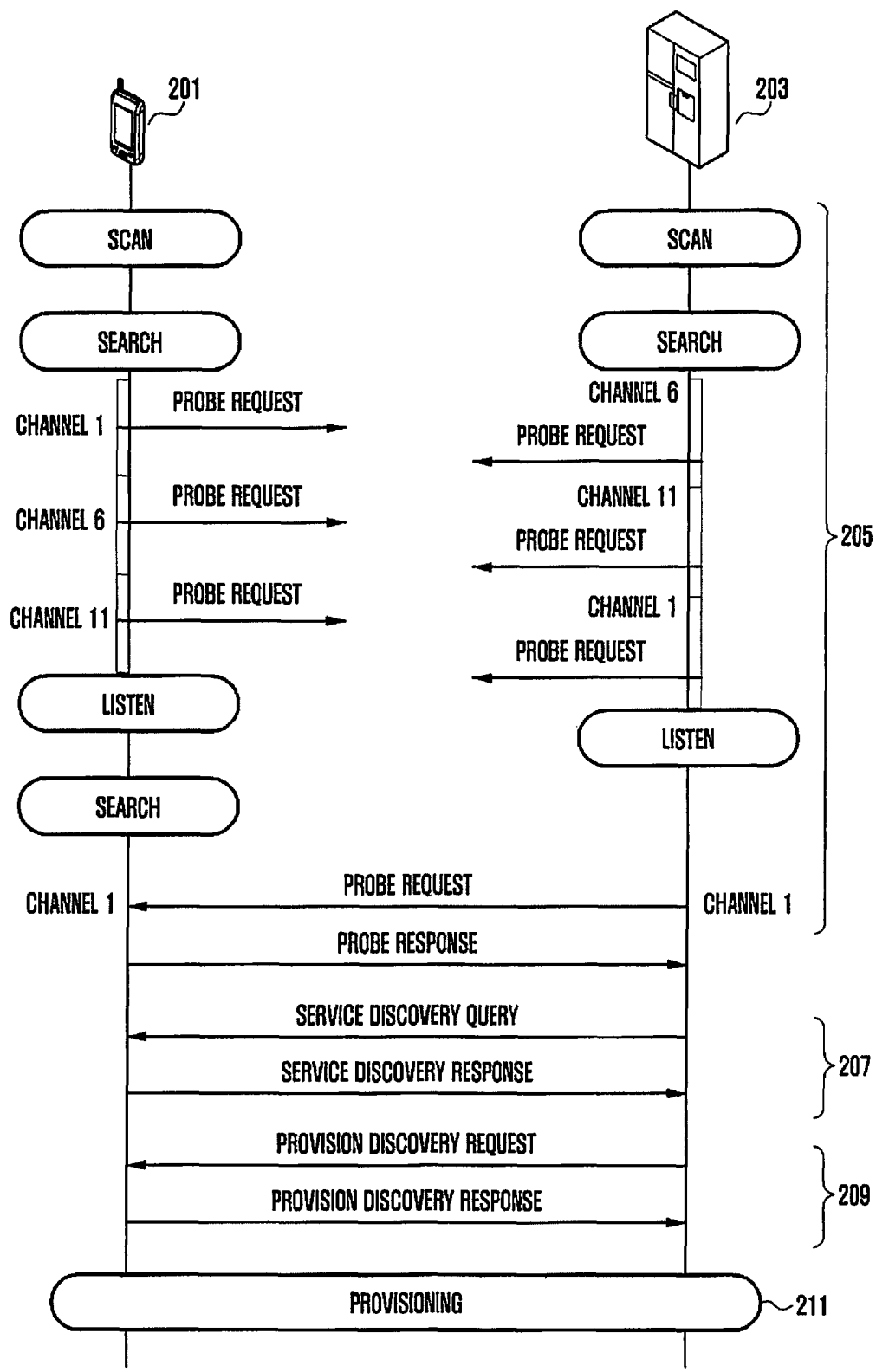
FIG. 2 is a sequence diagram illustrating a procedure for connecting a user equipment and a home appliance operating in Wi-Fi P2P mode.

FIG. 2 is a sequence diagram illustrating a procedure for connecting a user equipment (UE) and a home appliance operating in Wi-Fi P2P mode.

Referring to FIG. 2, at step 205, the UE 201 and the home appliance 203 may perform P2P device discovery.

After entering P2P device discovery mode, the UE 201 or the home appliance 203 may perform P2P device discovery. For example, when a Wi-Fi P2P application is run according to user input or run automatically according to an event, or when a Wi-Fi Simple Configuration (WSC) request is issued, the UE 201 or the home appliance 203 may enter P2P device discovery mode.

The UE 201 or the home appliance 203 may perform P2P device discovery by repeatedly searching for a counterpart or listening to a response from another device.

During the search state, the UE 201 or the home appliance 203 may scan channels. Channel scanning may be repeatedly performed for all available channels (e.g. channels 1 to 11) or for social channels (channels 1, 6 and 11) for a rapid search. Channel scanning may include identifying whether a specific frame or specific message is received.

The UE 201 and the home appliance 203 may perform P2P device discovery by exchanging probe requests and probe responses. For example, the UE 201 may send a probe request to the home appliance 203, and the home appliance 203 may send a probe response as a reply to the UE 201.

The probe request is one of management frames and broadcast frames, and may include at least one of a P2P information element (IE), a WSC IE, and a Supp Reg IE. The probe response may include at least one of a P2P IE, a WSC IE, a Supp Reg IE, and a Robust Security Network (RSN) IE.

The UE 201 and the home appliance 203 may reach a common channel and discover each other after repeated searching and listening. Here, the UE 201 and the home appliance 203 may identify each other's capabilities or restrict each other's responses by exchanging a probe request and a probe response.

When the device discovery time has expired without a counterpart being discovered, the UE 201 and the home appliance 203 may terminate device discovery or perform rescanning to restart P2P device discovery.

Thereafter, at step 207, the UE 201 and the home appliance 203 may perform service discovery. As an effort to identify each other's compatible services, the UE 201 and the home appliance 203 may perform service discovery to exchange information about services provided by higher layers. Service discovery may be conducted by use of a service discovery query and a service discovery response.

The home appliance 203 may use a service discovery query to designate a service protocol type and to send service information matching the service protocol type as query data.

The service protocol type may be one of UPnP, Bonjuor, WS-Discovery, and web-service related protocol. The service protocol type may be extended if necessary using reserved bits, and may be represented in various ways using a vendor specific field. In various embodiments, the service protocol type may indicate a protocol corresponding to the type of the home appliance 203.

The UE 201 may use a service discovery response to send a service protocol type and response data. The UE 201 may send a service discovery response containing a service discovery status code, which indicates a value corresponding to one of service discovery results (success, not available, and bad request).

At step 209, the UE 201 and the home appliance 203 may perform provision discovery exchange.

For provision discovery exchange, the UE 201 and the home appliance 203 may exchange a provision discovery request and a provision discovery response. For example, the home appliance 203 may send a provision discovery request to the UE 201, and the UE 201 may send a provision discovery response as a reply to the home appliance 203.

Finally, at step 211, the UE 201 and the home appliance 203 may perform provisioning.

The UE 201 and the home appliance 203 may establish a P2P connection through provisioning. The UE 201 and the home appliance 203 may form a Wi-Fi P2P network through an actual operating channel. Thereafter, the UE 201 and the home appliance 203 may exchange information needed to configure a smart home environment through the Wi-Fi P2P network.

Figure 3:
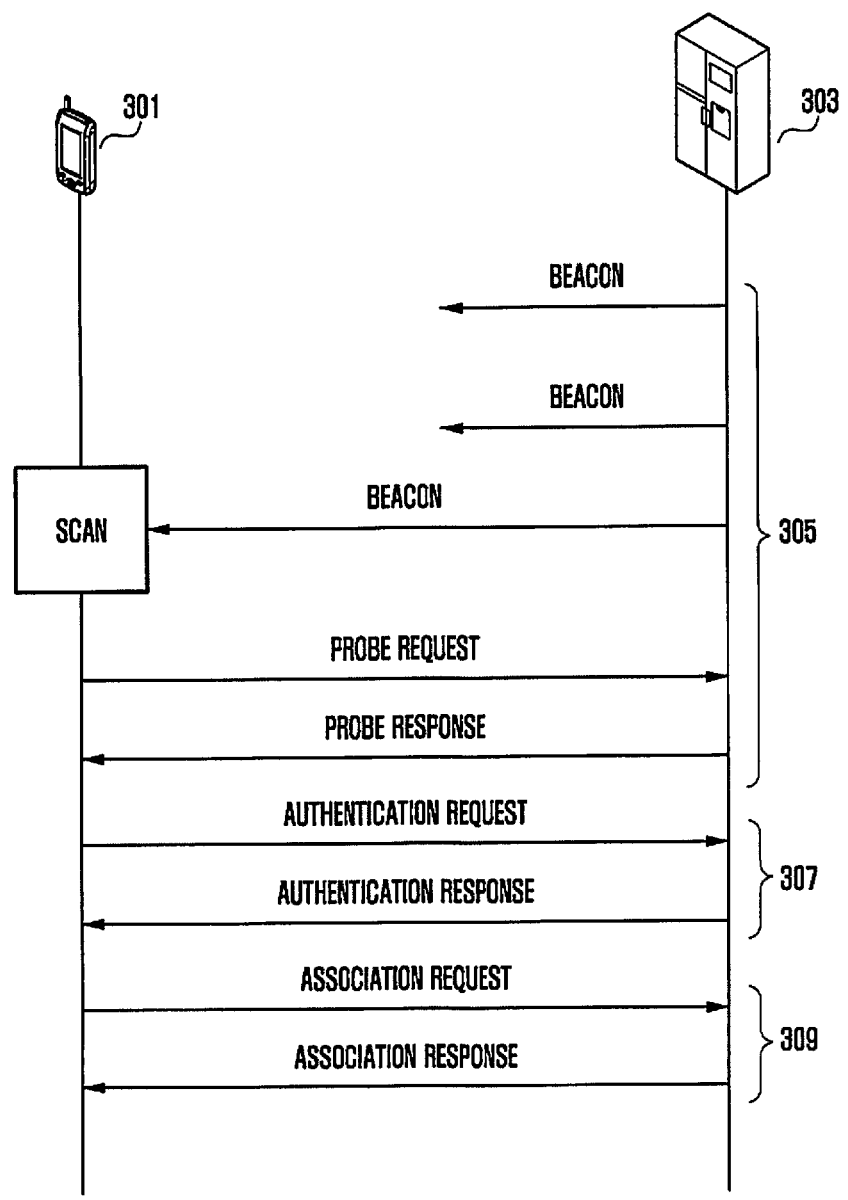
FIG. 3 is a sequence diagram illustrating a procedure for connecting a user equipment and a home appliance operating in Soft AP mode.

FIG. 3 is a sequence diagram illustrating a procedure for connecting a user equipment and a home appliance operating in Soft AP mode.

Referring to FIG. 3, at step 305, to connect to a home appliance 303 operating in Soft AP mode, the UE 301 scans channels to discover a channel used by the home appliance 303.

The home appliance 303 sends a beacon at regular intervals, and the UE 301 may receive a beacon through channel scanning. A beacon is a message that enables the home appliance 303 to notify its presence to nearby UEs and enables the UE 301 to communicate with the home appliance 303. A beacon is one of management frames and broadcast frames. The beacon sent by the home appliance 303 may include Service Set Identifier (SSID), beacon interval, and capability information of the home appliance 303. Such a beacon may include a vendor specific field to represent various information.

In various embodiments, a beacon may include a SHP (Smart Home Protocol) flag field indicating whether the transmitter is a smart home device, and the SHP flag field may be included in the vendor specific field.

Alternatively, a beacon may include an easy pairing mode IE field indicating whether the transmitter allows communication mode negotiation and indicating the communication mode being used. The easy pairing mode IE field may be included in the vendor specific field.

Upon reception of a beacon, the UE 301 analyzes information contained in the beacon to determine whether the home appliance 303 having sent the beacon corresponds to a home appliance to be registered. If the home appliance 303 corresponds to a home appliance to be registered, the UE 301 sends a probe request to the home appliance 303 and receives a probe response from the home appliance 303.

Thereafter, at step 307, the UE 301 and the home appliance 303 perform authentication.

For authentication, the UE 301 sends an authentication request to the home appliance 303, and the home appliance 303 sends an authentication response to the UE 301. The authentication request/response may include information needed for negotiation on the encryption scheme used by the UE 301 and home appliance 303.

After successful authentication, at step 309, the UE 301 and the home appliance 303 establishes a connection.

For connection establishment, the UE 301 and the home appliance 303 may exchange an association request and an association response. For example, the association request may include information regarding various capabilities, beacon listen interval, SSID, supported rates, supported channels, RSN, mobility domain, supported operating classes, Traffic Indication Map (TIM) broadcast request, and interworking service capabilities. The association response may include information regarding various capabilities, status code, AID (association ID), supported rates, EDCA (Enhanced Distributed Channel Access) parameter set, RCPI (Received Channel Power Indicator), RSNI (Received Signal to Noise Indicator), mobility domain, timeout interval (association comeback time), overlapping BSS scan parameters, TIM broadcast response, and QoS map.

In various embodiments, the association request may include an easy pairing mode IE field indicating whether the home appliance 303 allows communication mode negotiation and indicating the communication mode being used. The easy pairing mode IE field may be included in the vendor specific field of the association request. The association response may include an easy pairing mode IE field indicating the communication mode preferred by the UE 301 and indicating the communication mode being used. The easy pairing mode IE field may be included in the vendor specific field of the association response.

After association establishment, the UE 301 and the home appliance 303 may exchange information needed to configure a smart home environment.

Figure 4:
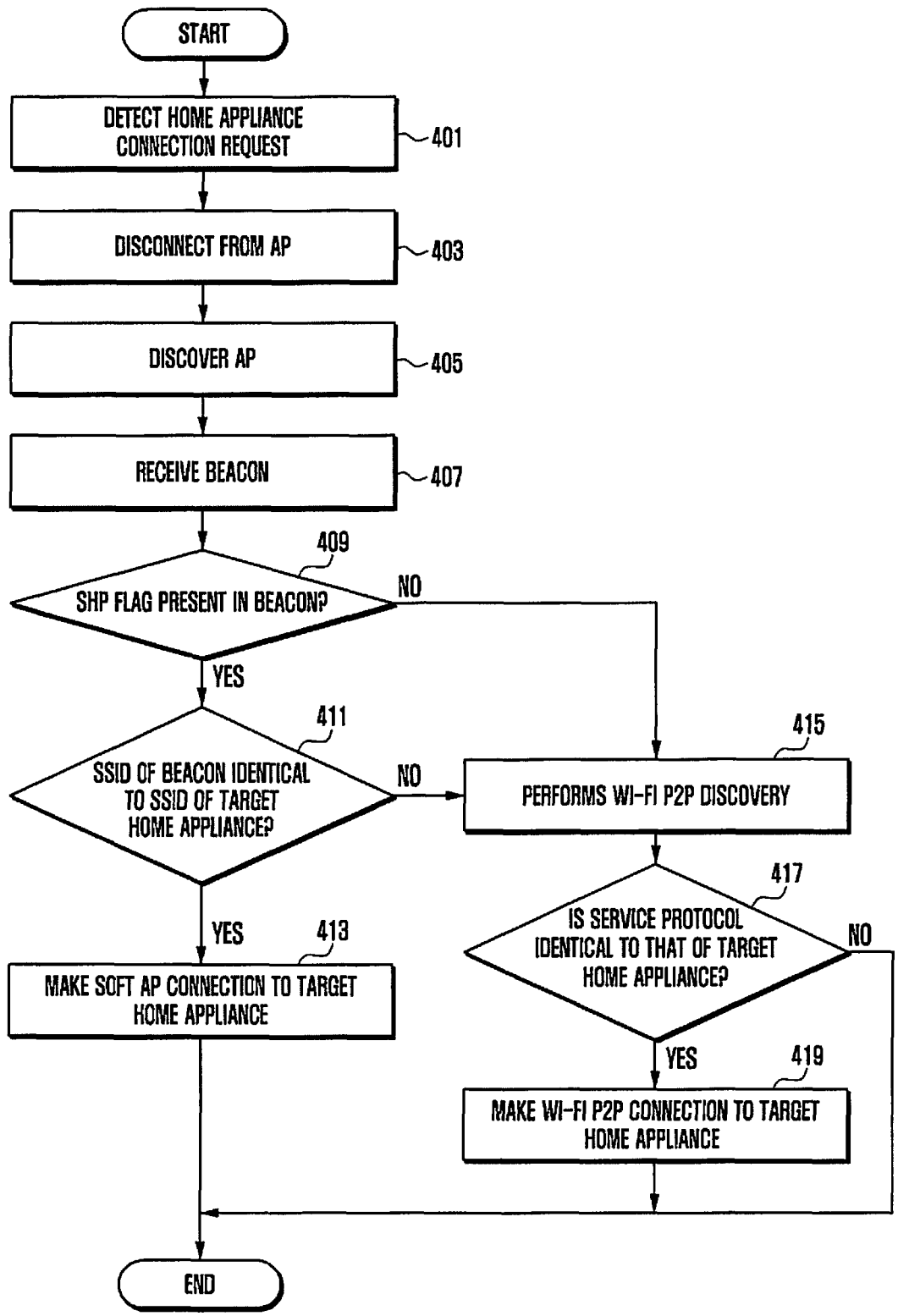
FIG. 4 is a flowchart illustrating a procedure for a user equipment to connect to a home appliance according to a first embodiment of the present invention.

FIG. 4 is a flowchart illustrating a procedure for a user equipment to connect to a home appliance according to a first embodiment of the present invention.

Referring to FIG. 4, at step 401, the UE detects a home appliance connection request.

The UE may receive a home appliance connection request issued by user input or an application. The UE may obtain information regarding the home appliance to be associated (target home appliance), such as home appliance type, SSID, and service protocol.

At step 403, when the UE is currently connected to an AP, the UE may disconnect from the AP.

In various embodiments, upon detection of a home appliance connection request, the UE attempts to discover a home appliance in Soft AP mode. As the UE is unable to connect to multiple APs at the same time in most cases, to connect to a home appliance operating in Soft AP mode, the UE has to terminate an existing connection to an AP.

However, if the UE is able to connect to multiple APs at the same time, the UE does not have to terminate an existing connection to an AP.

In the description, it is assumed that the UE attempts to discover a home appliance in Soft AP mode first. However, the UE may attempt to discover a home appliance in Wi-Fi P2P mode first. In this case, corresponding modifications are possible within the spirit of the present invention.

At step 405, the UE attempts to discover an AP according to Soft AP mode. The UE may scan beacons sent in the vicinity. Here, such beacons may be sent by one or more home appliances including or not including the target home appliance.

Figure 5:
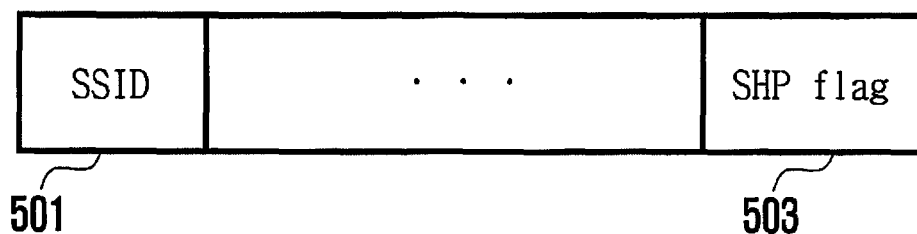
FIG. 5 shows a Soft AP beacon frame format according to the first embodiment of the present invention.

In various embodiments, the beacon sent by a smart home device like a home appliance may have a format as shown in FIG. 5. The beacon may include SSID 501 and SHP (Smart Home Protocol) flag 503.

The SSID 501 may refer to identification information of the smart home device, and the identification information may be assigned on a per-device basis or on a device model basis. The SSID 501 may be dynamically designated if necessary, and may also be designated according to a specific rule of a user application. The SSID 501 may be generated on the basis of a smart home device indicator, device type, date of manufacture, and version. For example, when a refrigerator supporting smart home functions is manufactured in 2014, the SSID 501 of the refrigerator may be set to "SHP.Fridge.2014".

The SHP flag 503 is used to indicate whether the home appliance supports smart home functions. The SHP flag 503 may be of a Boolean type and may be a 1-bit indicator having a value of 0 or 1 (True or False). The beacon may further include information regarding timestamp, beacon interval, and capability.

At step 407, the UE receives a beacon as a result of scanning. Upon reception of a beacon, at step 409, to determine whether the beacon is sent by a smart home device, the UE checks whether a SHP flag 503 is present in the beacon. The UE may determine whether the device having sent the beacon is a smart home device according to presence of a SHP flag 503 or the value thereof.

When the device having sent the beacon is a smart home device, the UE checks whether the device having sent the beacon is the target home appliance. Specifically, at step 411, the UE checks whether the SSID 501 of the beacon is identical to the SSID of the target home appliance.

If the SSID 501 of the beacon is identical to the SSID of the target home appliance, at step 413, the UE determines that the device having sent the beacon is the target home appliance and makes a Soft AP connection to the target home appliance. The procedure for Soft AP connection is described before.

If a SHP flag is not present in the beacon or if the SSID of the beacon is not identical to that of the target home appliance in the presence of a SHP flag, at step 415, the UE determines that the target home appliance is not using Soft AP mode and performs Wi-Fi P2P discovery to detect the target home appliance. Here, Wi-Fi P2P discovery may include at least one of channel scanning and service discovery.

During Wi-Fi P2P discovery, the UE may send information on the service protocol of the target home appliance and receive information on the service protocol from a device.

In various embodiments, the service protocol type may be defined as shown in Table 1 below. The service protocol type may indicate a smart home service protocol for a smart home device, and may be assigned using values not used by existing service protocols or using vendor specific values. The service protocol type may be assigned so as to correspond to smart home device types (e.g. TV, refrigerator, air conditioner, and washing machine). The service protocol type may be sent through probe request/probe response or service discovery query/service discovery response.

TABLE 1

| value | Meaning |
| --- | --- |
| 0 | All service types |
| 1 | Bonjour |
| 2 | UPnP |
| 3 | WS-Discovery |
| 4 | SHP.Frige |
| 5 | SHP.Aircon |
| 6 | SHP.Washer |
| 7~254 | Reserved |
| 255 | Vendor specific |

During Wi-Fi P2P discovery, the UE sends nearby devices the service protocol type set to a value corresponding to the service protocol of the target home appliance. The UE may receive service protocol type values corresponding to service protocols of nearby devices therefrom. At step 417, the UE analyzes the received service protocol type values to find a service protocol identical to that of the target home appliance.

If a service protocol identical to that of the target home appliance is found, at step 419, the UE determines that the device having sent the found service protocol type is the target home appliance and makes a Wi-Fi P2P connection to the target home appliance. The procedure for Wi-Fi P2P connection is described before.

If a service protocol identical to that of the target home appliance is not found, the UE ends the connection procedure of the present invention.

Figure 6:
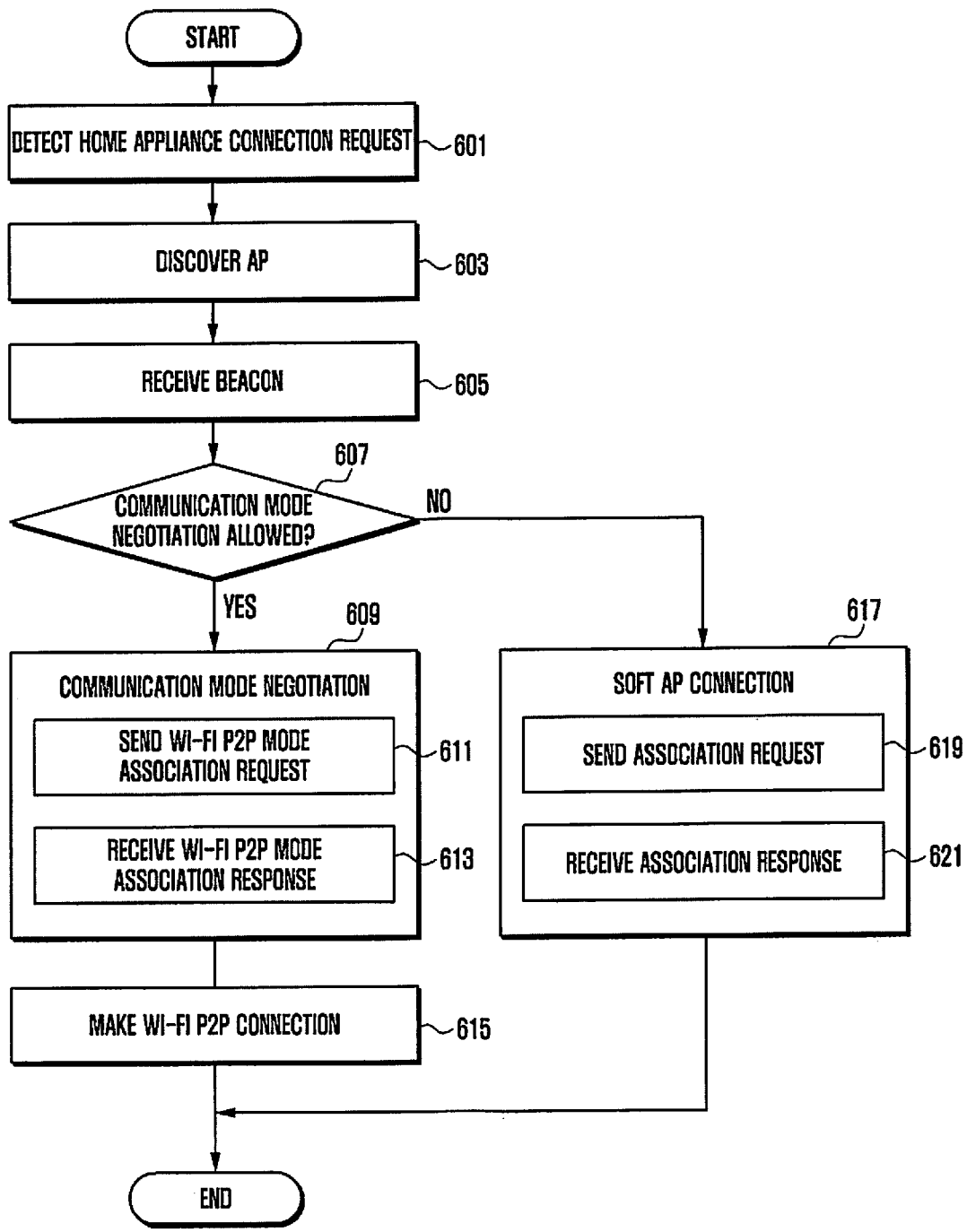
FIG. 6 is a flowchart illustrating a procedure for a user equipment to connect to a home appliance according to a second embodiment of the present invention.

FIG. 6 is a flowchart illustrating a procedure for a user equipment to connect to a home appliance according to a second embodiment of the present invention.

Referring to FIG. 6, at step 601, the UE detects a home appliance connection request.

The UE may receive a home appliance connection request issued by user input or an application. The UE may obtain information regarding the home appliance to be associated (target home appliance), such as home appliance type, SSID, and service protocol.

In the description, it is assumed that the UE attempts to discover a home appliance in Soft AP mode first. However, the UE may attempt to discover a home appliance in Wi-Fi P2P mode first. In this case, corresponding modifications are possible within the spirit of the present invention.

Thereafter, at step 603, the UE attempts to discover an AP according to Soft AP mode. The UE may scan beacons sent in the vicinity. Here, such beacons may be sent by one or more home appliances including or not including the target home appliance.

Figure 7:
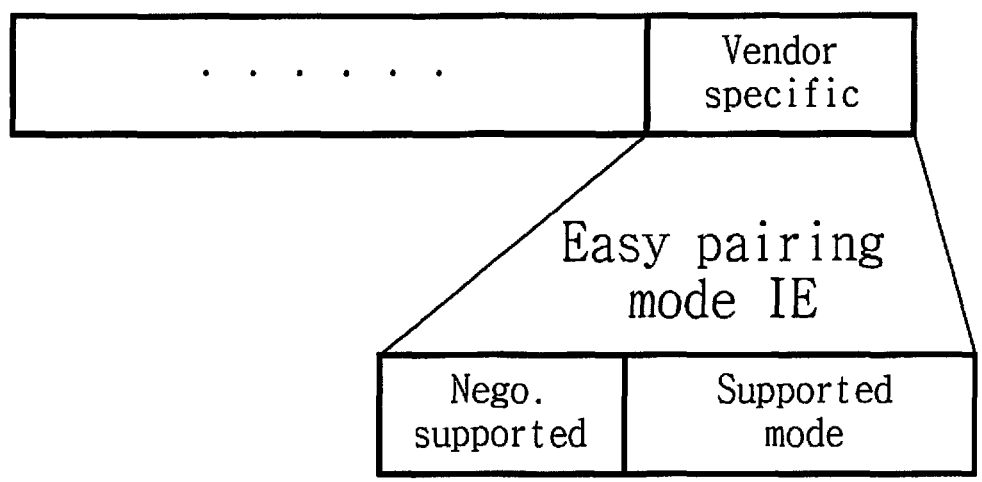
FIG. 7 shows a Soft AP beacon frame format according to the second embodiment of the present invention.

In various embodiments, the beacon sent by a smart home device like a home appliance may have a format as shown in FIG. 7. The beacon may include an easy pairing mode IE. The easy pairing mode IE may include an indication (negotiation supported) indicating whether the smart home device supports communication mode negotiation, and an indication (supported mode) indicating the communication mode supported by the smart home device.

Communication mode negotiation may be allowed for a smart home device supporting both Wi-Fi P2P mode and Soft AP mode. That is, in the case of a smart home device supporting both Wi-Fi P2P mode and Soft AP mode, the smart home device operating currently in Soft AP mode may switch the communication mode to Wi-Fi P2P mode and make a connection to the UE. In this case, the smart home device may transmit a beacon containing an indication for supporting communication mode negotiation. On the other hand, a smart home device not supporting Wi-Fi P2P mode may transmit a beacon containing an indication for not supporting communication mode negotiation.

The "negotiation supported" indication may be represented by a 1-bit Boolean type value, and the "supported mode" indication may be represented by bits of an enumeration or string type. In a beacon, the easy pairing mode IE may be stored as a separate field or may be stored in the vendor specific field as shown in FIG. 7.

At step 605, the UE receives a beacon as a result of scanning. Upon reception of a beacon, the UE may determine whether the beacon is sent by the target home appliance on the basis of the SSID of the beacon. If the beacon is sent by the target home appliance, at step 607, the UE may analyze the easy pairing mode IE in the beacon to identify whether the target home appliance permits communication mode negotiation and the communication mode supported by the target home appliance.

If the target home appliance permits communication mode negotiation, at step 609, the UE performs communication mode negotiation with the target home appliance.

For connecting to the target home appliance, the UE may prefer a different communication mode (i.e. Wi-Fi P2P mode) to the current communication mode (i.e. Soft AP mode). The preferred communication mode may be determined on the basis of channel states, power usage states, battery states, and radio resource usage states of the UE.

To continue the connection procedure using a communication mode different from that currently used by the discovered target home appliance, the UE may determine the possibility of communication mode change of the target home appliance (i.e. whether the target home appliance supports communication mode negotiation) and negotiate with the target home appliance for communication mode change accordingly. Hence, the subsequent steps may be performed when the communication mode preferred by the UE is different from that currently used by the target home appliance capable of supporting both Soft AP mode and Wi-Fi P2P mode. In some cases depending upon implementations, communication mode negotiation may be conducted even if the above conditions are not met.

Figure 8:
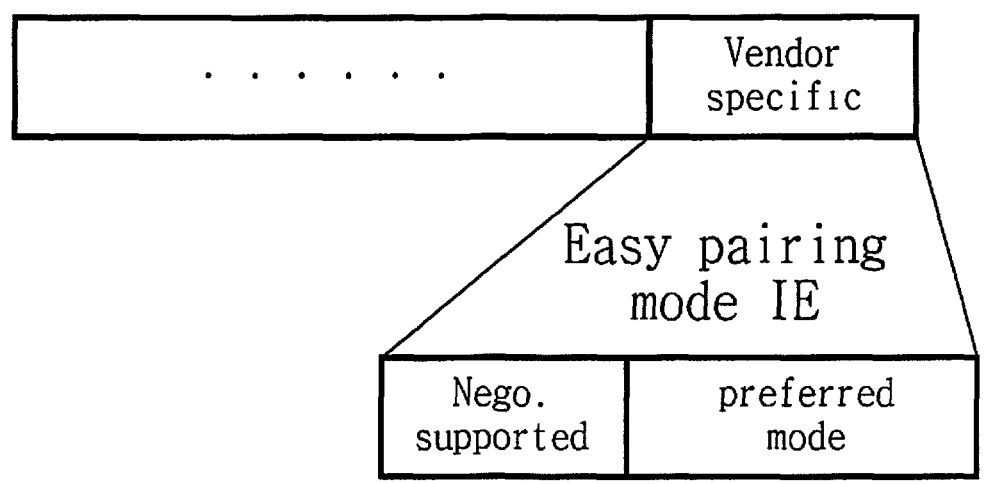
FIG. 8 shows an association request frame format according to the second embodiment of the present invention.

At step 611, the UE sends the target home appliance information regarding support of communication mode negotiation and preferred communication mode. This information may be sent via an association request frame as shown in FIG. 8. The above information may be contained in the easy pairing mode IE field of an association request frame. The easy pairing mode IE may include an indication (negotiation supported) indicating whether the UE supports communication mode negotiation, and an indication (supported mode) indicating the communication mode preferred by the UE.

The communication mode preferred by the UE may be determined on the basis of channel states, power usage states, battery states, and radio resource usage states of the UE. The communication mode preferred by the UE may be Wi-Fi P2P mode.

The "negotiation supported" indication may be represented by a 1-bit Boolean type value, and the "supported mode" indication may be represented by bits of an enumeration or string type. The easy pairing mode IE may be stored as a separate field or may be stored in the vendor specific field as shown in FIG. 8.

Figure 9:
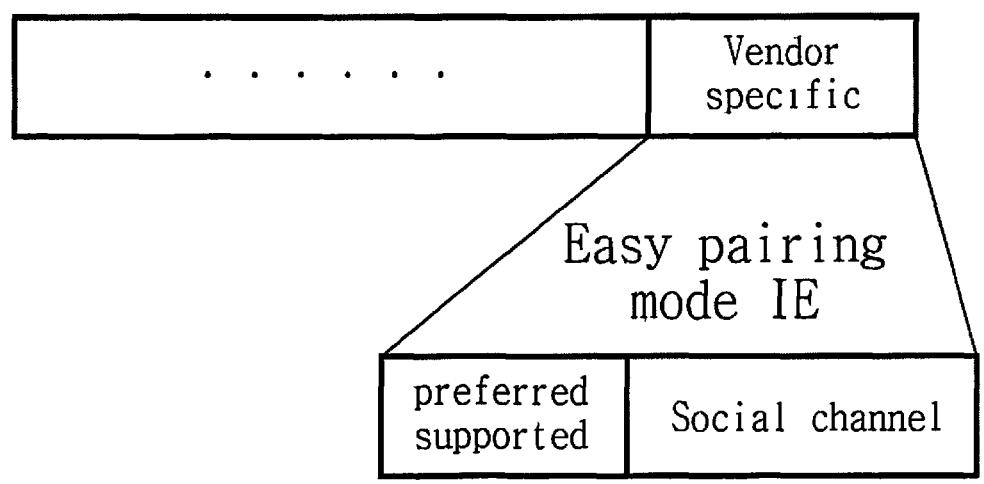
FIG. 9 shows an association response frame format according to the second embodiment of the present invention.

At step 613, the UE receives information regarding the communication mode preferred by the target home appliance and the channel to be used as a reply from the target home appliance. This information may be sent via an association response frame as shown in FIG. 9. The above information may be contained in the easy pairing mode IE field of an association response frame. The easy pairing mode IE may include an indication (preferred supported) indicating the communication mode preferred by the target home appliance, and an indication (social channel) indicating the channel to be used in the preferred communication mode.

The communication mode preferred by the target home appliance may be determined on the basis of channel states, power usage states, and radio resource usage states of the target home appliance.

The communication mode preferred by the target home appliance may be identical to or different from that preferred by the UE. When the communication mode preferred by the target home appliance is identical to that preferred by the UE (e.g. Wi-Fi P2P mode), the UE may determine that communication mode negotiation is successful. Hence, at step 615, the UE makes a Wi-Fi P2P connection to the target home appliance according to the result of negotiation. The procedure for Wi-Fi P2P connection is described before.

If the target home appliance disallows communication mode negotiation or the communication mode preferred by the target home appliance is different from that preferred or proposed by the UE, at step 617, the UE makes a Soft AP connection to the target home appliance according to the current communication mode. Here, as the UE and the target home appliance have completed discovery through beacon reception, Soft AP connection establishment may be composed of sending an authentication and/or association request (step 619) and receiving an association response (step 621).

Figure 10:
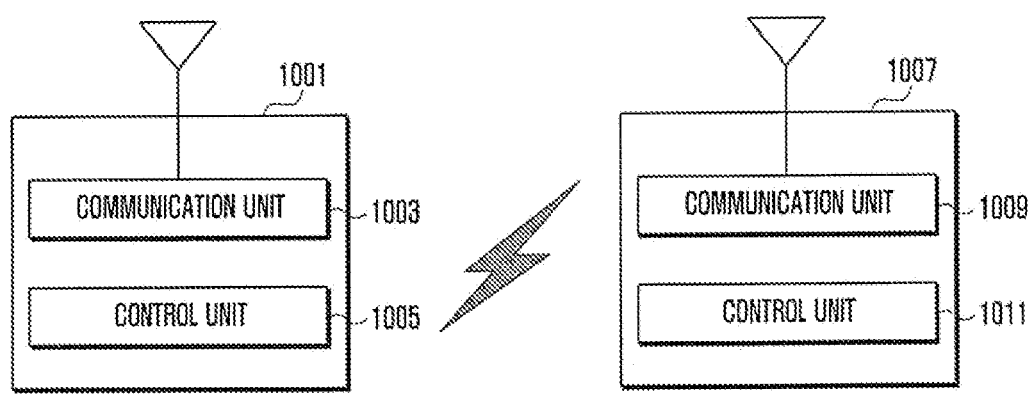
FIG. 10 illustrates block diagrams of a user equipment and a home appliance according to the present invention.

FIG. 10 illustrates block diagrams of a user equipment and a home appliance according to the present invention.

Referring to FIG. 10, the UE 1001 may include a communication unit 1003 and a control unit 1005.

The communication unit 1003 may communicate data with one or more home appliances such as the home appliance 1007 under the control of the control unit 1005.

The control unit 1005 may control individual components of the UE 1001 to perform an operation according to embodiments of the present invention. For example, the control unit 1005 may control establishment of a connection to the home appliance 1007 according to the communication mode selected in one embodiment.

The home appliance 1007 may include a communication unit 1009 and a control unit 1011.

The communication unit 1009 may communicate data with the UE 1001 under the control of the control unit 1011.

The control unit 1011 may control individual components of the home appliance 1007 to perform an operation according to embodiments of the present invention. For example, the control unit 1011 may control establishment of a connection to the UE 1001 according to the communication mode selected in one embodiment.

In addition to Soft AP mode and Wi-Fi P2P mode described before, the user equipment and home appliance of the present invention may establish a connection therebetween by use of various full or half duplex communication modes including Bluetooth, Bluetooth Low Energy (BLE), ZigBee, Radio Frequency (RF) communication, and Z-Wave. Next, a description is given of connection establishment between the UE and home appliance using various communication modes as an embodiment.

Figure 11:
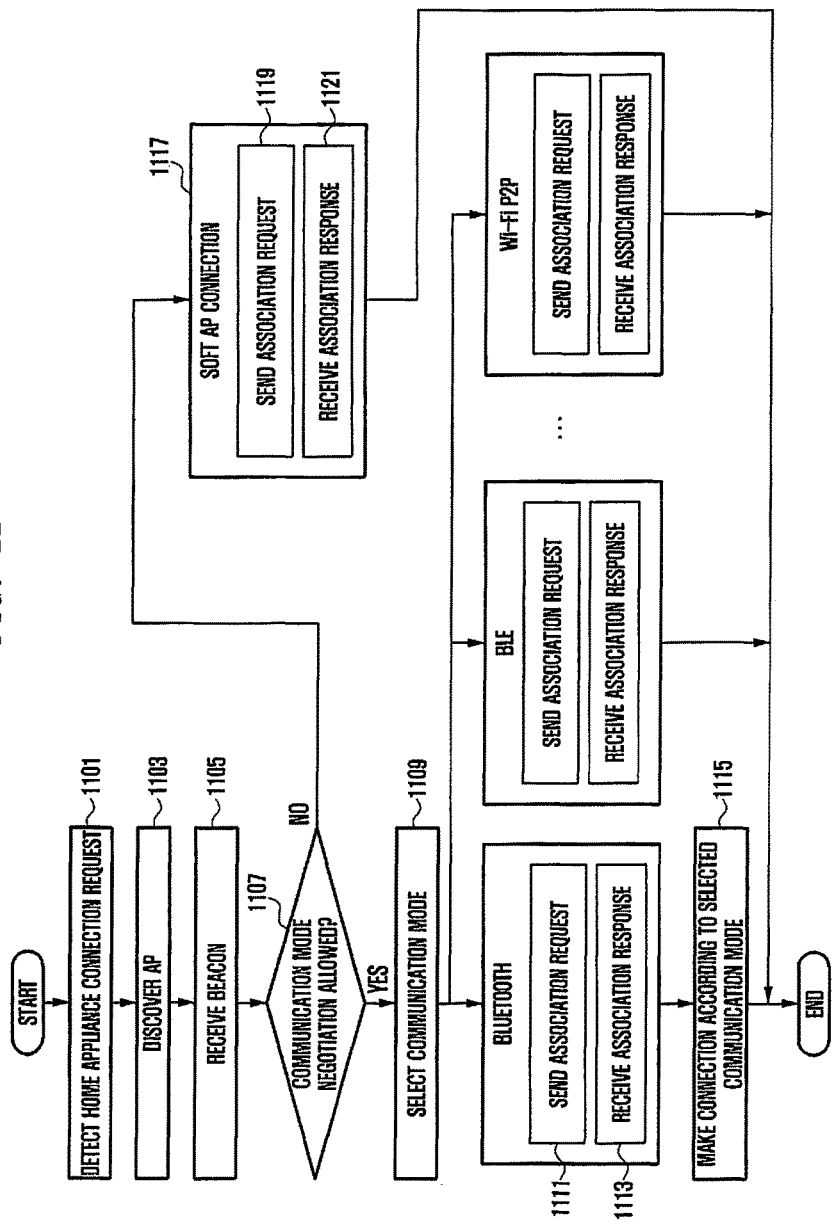
FIG. 11 is a flowchart illustrating a procedure for a user equipment to connect to a home appliance according to a third embodiment of the present invention.

FIG. 11 is a flowchart illustrating a procedure for a user equipment to connect to a home appliance according to a third embodiment of the present invention.

Referring to FIG. 11, at step 1101, the UE detects a home appliance connection request.

The UE may receive a home appliance connection request issued by user input or an application. The UE may obtain information regarding the home appliance to be associated (target home appliance), such as home appliance type, SSID, and service protocol.

In the description, it is assumed that the UE attempts to discover a home appliance in Soft AP mode first. However, the UE may attempt to discover a home appliance in Wi-Fi P2P mode first. In this case, corresponding modifications are possible within the spirit of the present invention.

At step 1103, the UE attempts to discover an AP according to Soft AP mode. The UE may scan beacons sent in the vicinity. Here, such beacons may be sent by one or more home appliances including or not including the target home appliance. At this step, reception of a beacon may be examined.

In various embodiments, the beacon sent by a smart home device like a home appliance may have a format as shown in FIG. 7. The beacon may include an easy pairing mode IE. The easy pairing mode IE may include an indication (negotiation supported) indicating whether the smart home device supports communication mode negotiation, and an indication (supported mode) indicating the communication mode supported by the smart home device.

When a smart home device supports various communication modes, it may transmit a beacon containing an indication for supporting communication mode negotiation. The "negotiation supported" indication may be represented by a 1-bit Boolean type value and the "supported mode" indication may be represented by bits of an enumeration or string type. The "supported mode" indication may be represented by one or more parameters indicating communication modes supported by the smart home device, such as Bluetooth, Bluetooth Low Energy (BLE), ZigBee, Radio Frequency (RF) communication, and Z-Wave. When the smart home device supports various communication modes, the "supported mode" indication may be set to a parameter indicating the most preferred one of the supported communication modes in consideration of network states, power usage states, the distance to the UE, and user settings. In a beacon, the easy pairing mode IE may be stored as a separate field or may be stored in the vendor specific field as shown in FIG. 7.

At step 1105, the UE receives a beacon as a result of scanning. Upon reception of a beacon, the UE may determine whether the beacon is sent by the target home appliance on the basis of the SSID of the beacon. If the beacon is sent by the target home appliance, at step 1107, the UE may analyze the easy pairing mode IE in the beacon to identify whether the target home appliance permits communication mode negotiation and the communication mode supported by the target home appliance.

To continue the connection procedure using a communication mode different from that currently used by the discovered target home appliance, the UE may determine the possibility of communication mode change of the target home appliance (i.e. whether the target home appliance permits communication mode negotiation) and negotiate with the target home appliance for communication mode change accordingly. Hence, the subsequent steps may be performed when the communication mode preferred by the UE is different from that currently used by the target home appliance. In some cases depending upon implementations, communication mode negotiation may be conducted even if the above condition is not met.

If the target home appliance permits communication mode negotiation, the UE performs communication mode negotiation with the target home appliance. At step 1109, the UE identifies communication modes supported by the target home appliance and selects a communication mode to be used on the basis of the supported mode indication in the received beacon. When the supported mode indication represents multiple communication modes, the UE may select the most preferred communication mode among the supported communication modes. The communication mode preferred by the UE may be determined on the basis of channel states, power usage states, battery states, and radio resource usage states of the UE. When the supported mode indication represents one communication mode, the UE may select the communication mode according to whether the communication mode is a preferred one.

Thereafter, the UE attempts to make a connection according to the selected communication mode. Next, a description is given of connection making steps commonly applicable to various communication modes selectable by the UE. The following description may be modified according to the communication mode selected by the UE within the subject matter of the present invention. In other words, the procedure for connection establishment of the UE may be changed in part according to the standard specifying the communication mode selected by the UE. However, such variations and modifications will still fall within the scope of the present invention.

Next, a description is given of a case where Bluetooth communication mode is selected by the UE. This description may also be applied to various other communication modes.

At step 1111, the UE sends the target home appliance information regarding support of communication mode negotiation and the selected communication mode. This information may be sent via an association request frame as shown in FIG. 8. The above information may be contained in the easy pairing mode IE field of an association request frame. The easy pairing mode IE may include an indication (negotiation supported) indicating whether the UE supports communication mode negotiation, and an indication (supported mode) indicating the communication mode selected by the UE.

The "negotiation supported" indication may be represented by a 1-bit Boolean type value, and the "supported mode" indication may be represented by bits of an enumeration or string type. The easy pairing mode IE may be stored as a separate field or may be stored in the vendor specific field as shown in FIG. 8.

At step 1113, the UE receives information regarding the communication mode preferred by the target home appliance and the channel to be used as a reply from the target home appliance. This information may be sent via an association response frame as shown in FIG. 9. The above information may be contained in the easy pairing mode IE field of an association response frame. The easy pairing mode IE may include an indication (supported mode) indicating the communication mode preferred by the target home appliance, and an indication (social channel) indicating the channel to be used in the preferred communication mode.

When the communication mode preferred by the target home appliance is identical to that selected by the UE, the UE may determine that communication mode negotiation is successful. Hence, at step 1115, the UE makes a connection to the target home appliance according to the communication mode proposed at the negotiation (e.g. Bluetooth mode).

In one embodiment, when the supported mode indication represents one communication mode of the target home appliance, the communication mode preferred by the target home appliance is identical to that selected by the UE and communication mode negotiation may be regarded as successful.

If the target home appliance disallows communication mode negotiation or the communication mode preferred by the target home appliance is different from that selected by the UE, at step 1117, the UE makes a connection to the target home appliance according to the current communication mode (i.e. Soft AP mode). Here, as the UE and the target home appliance have completed discovery through beacon reception, Soft AP connection establishment may be composed of sending an authentication and/or association request (step 1119) and receiving an association response (step 1121).

The description of the various embodiments is to be construed as exemplary only and does not describe every possible instance of the present invention. Therefore, it should be understood that various changes may be made and equivalents may be substituted for elements of the present invention.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

What is claimed is:

1. A method for connecting a user equipment to electronic devices, the method comprising:
   receiving, for a connection to an electronic device, a first broadcast message transmitted by the electronic device according to a first communication mode, wherein the first broadcast message includes information indicating whether the electronic device supports a connection to the electronic device according to at least one of the first communication mode or a second communication mode that is different from the first communication mode;
   determining whether the electronic device supports the connection to the electronic device according to the second communication mode based on the information; and
   establishing the connection to the electronic device according to the second communication mode based on a result of the determining,
   wherein establishing the connection to the electronic device according to the second communication mode comprises:
   receiving a second broadcast message transmitted by the electronic device according to the second communication mode, wherein the first broadcast message includes the information indicating that the electronic device supports the connection to the electronic device according to the second communication mode and identification information included in the first broadcast message corresponds to identification information of the electronic device.

2. The method of claim 1, further comprising:
   performing an authentication with the electronic device; and
   establishing the connection to the electronic device according to the first communication mode.

3. The method of claim 1, wherein the first broadcast message includes a beacon frame, and
   wherein the information indicating that the electronic device supports the connection to the electronic device according to the at least one of the first communication mode or the second communication mode is stored in a protocol flag field.

4. The method of claim 1, wherein establishing the connection to the electronic device according to the second communication mode comprises:
   determining whether a first service protocol type included in the second broadcast message corresponds to a second service protocol type for the connection to the electronic device; and
   establishing the connection to the electronic device according to the second communication mode, wherein the first service protocol type included in the second broadcast message corresponds to the second service protocol type for the connection to the electronic device.

5. The method of claim 4, wherein the first service protocol type is defined to include at least one value assigned to one or more electronic devices.

6. The method of claim 1, wherein the first communication mode is a soft access point (AP) mode, and the second communication mode is a Wi-Fi peer to peer (P2P) mode.

7. A user equipment capable of connecting to electronic devices, comprising:
   a transceiver configured to communicate with one or more of the electronic devices; and
   a controller configured to:
   receive, for a connection to an electronic device, a first broadcast message transmitted by the electronic device according to a first communication mode, wherein the first broadcast message includes information indicating whether the electronic device supports a connection to the electronic device according to at least one of the first communication mode or a second communication mode that is different from the first communication mode;
   determine whether the electronic device supports the connection to the electronic device according to the second communication mode based on the information; and
   establish the connection to the electronic device according to the second communication mode based on a result of the determining,
   wherein the controller is further configured to:
   receive a second broadcast message transmitted by the electronic device according to the second communication mode, wherein the first broadcast message includes the information indicating that the electronic device supports the connection to the electronic device according to the second communication mode and identification information included in the first broadcast message corresponds to identification information of the electronic device.

8. The user equipment of claim 7, wherein the controller is further configured to:
   perform an authentication with the electronic device, and
   establish the connection to the electronic device according to the first communication mode.

9. The user equipment of claim 7, wherein the controller is further configured to:

determine whether a first service protocol type included in the second broadcast message corresponds to a second service protocol type for the connection to the electronic device, and establish the connection to the electronic device according to the second communication mode, wherein the first service protocol type included in the second broadcast message corresponds to the second service protocol type for the connection to the electronic device.

10. E user equipment of claim 7, wherein the first broadcast message includes a beacon frame, and wherein the information indicating that the electronic device supports the connection to the electronic device according to the at least one of the first communication mode or the second communication mode is stored in a protocol flag field.

11. The user equipment of claim 10, wherein the first service protocol type is defined to include at least one value assigned to one or more electronic devices.

12. The user equipment of claim 7, wherein the first communication mode is a soft access point (AP) mode, and the second communication mode is a Wi-Fi peer to peer (P2P) mode.

\* \* \* \* \*

UNITED STATES PATENT AND TRADEMARK OFFICE
CERTIFICATE OF CORRECTION

PATENT NO. : 11,706,294 B2
APPLICATION NO. : 17/525002
DATED : July 18, 2023
INVENTOR(S) : Junhyung Kim et al.

Page 1 of 1

It is certified that error appears in the above-identified patent and that said Letters Patent is hereby corrected as shown below:

In the Claims

In Column 15, Line 10, in Claim 10:
"10. E user equipment of claim 7, wherein the first broad-"
Should be:
-- 10. The user equipment of claim 7, wherein the first broad- --.

Signed and Sealed this
Seventh Day of May, 2024

Katherine Kelly Vidal
*Director of the United States Patent and Trademark Office*